United States Patent [19]
Heibel

[11] 3,773,150
[45] Nov. 20, 1973

[54] DISC BRAKES FOR VEHICLES
[75] Inventor: Helmut Heibel, Moschheim, Germany
[73] Assignee: Girling Limited, Birmingham, England
[22] Filed: Mar. 15, 1972
[21] Appl. No.: 234,939

[30] Foreign Application Priority Data
Mar. 27, 1971 Great Britain ..................... 8,004/71

[52] U.S. Cl. ............................... 188/73.5, 188/73.3
[51] Int. Cl. ............................................ F16d 65/00
[58] Field of Search ................. 188/71.1, 72.4, 73.3, 188/73.4, 73.5

[56] References Cited
UNITED STATES PATENTS
3,279,564 10/1966 Gancel ............................ 188/72.4
3,451,509 6/1969 DeHoff ............................. 188/73.5
3,625,314 12/1971 Rinker ........................... 188/73.3 X

*Primary Examiner*—George E. A. Halvosa
*Attorney*—Samuel Scrivener, Jr. et al.

[57] ABSTRACT

In a vehicle disc brake of the sliding caliper member type complementary surfaces of the caliper member and of a stationary member relative to which the caliper member is slidable are urged into engagement by resilient means. The resilient means acts between the members through a lever which engages with one member and is pivotally connected to the other.

11 Claims, 4 Drawing Figures

DISC BRAKES FOR VEHICLES

SPECIFIC DESCRIPTION

This invention relates to disc brakes for vehicles of the kind in which friction pad assemblies for engagement with opposite faces of a rotatable disc are located in a caliper member which straddles a portion of the peripheral edge of the disc and which is guided for movement with respect to the disc on a stationary drag-taking member adjacent the disc, and actuating means are adapted to apply at least one of the friction pad assemblies directly to one face of the disc, resilient means being provided for urging complementary surfaces of the members into engagement.

According to our invention in a disc brake of the kind set forth for vehicles the resilient means acts between the members through a lever which engages with a part of one member to urge complementary surfaces of the members into engagement, the lever being pivotally connected to the other member.

Preferably the resilient means acts on the lever at one of a pair of relatively spaced locations, at one of which one pair or set of complementary surfaces of the members are urged into engagement, and at the other of which another different pair or set of complementary surfaces of the members are urged into engagement.

Conveniently the locations are disposed in positions such that, when the resilient means act on one of the locations, complementary circumferentially arranged surfaces on the members are urged into engagement and, when the resilient means act on the other location, complementary radially arranged surfaces on the members are urged into engagement.

Preferably the lever is formed with a pair of abutment surfaces disposed at right angles to each other and intersecting at their inner ends for engagement with complementary surfaces on the said one member. The pivotal connection between the lever and the said other member and the abutment surfaces are relatively arranged so that the abutment surfaces act as a stop to prevent substantial relative movement between the members at least in a radial direction, upon failure of the resilient means.

In one construction of brake a pair of levers and a pair of resilient means are located at circumferentially spaced opposite ends of a brake and each resilient means comprises a tension spring acting between a fixed anchorage on the said one member and one of the locations on the lever which is connected to the other member by means of a pivotal connection. Thus the levers form circumferentially spaced stops, and one of the abutment surfaces on each lever acts on a complementary surface the said one member under the influence of a tension spring. The levers may be biassed by the tension springs in directions such that one lever subjects the said one member to a circumferentially directed force and the other lever subjects the said one member to a radially directed force.

One embodiment of our invention is illustrated in the accompanying drawings in which.

Figure 1:
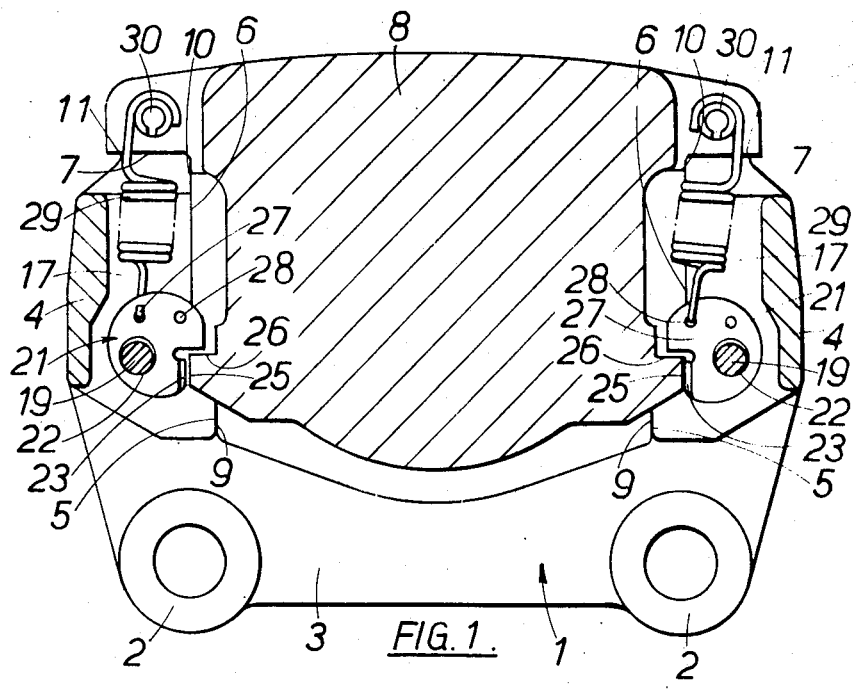
FIG. 1 is a transverse section through an hydraulically operated disc brake.
Figure 2:
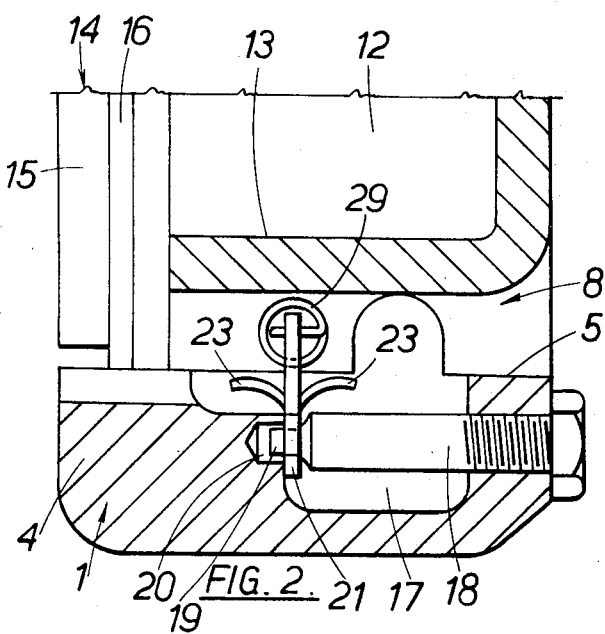
FIG. 2 is a longitudinal half-section of the brake actuator and the stationary drag-taking member.
Figure 3:
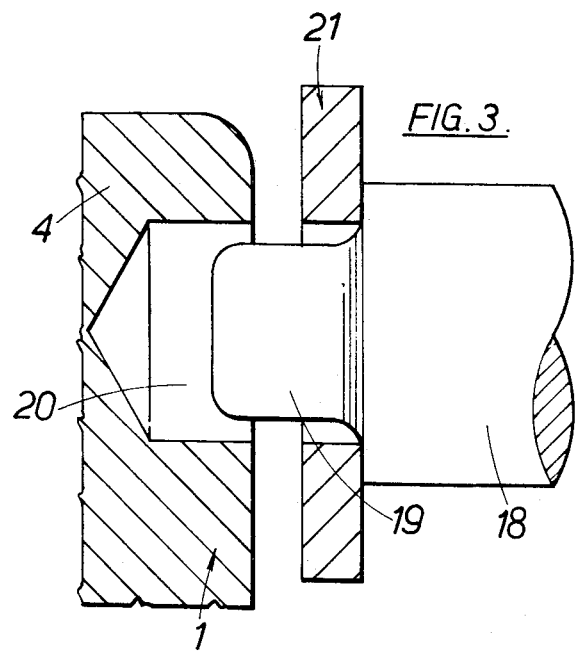
FIG. 3 is a view on an enlarged scale of the pivotal connection for the lever shown in FIG. 2.
Figure 4:
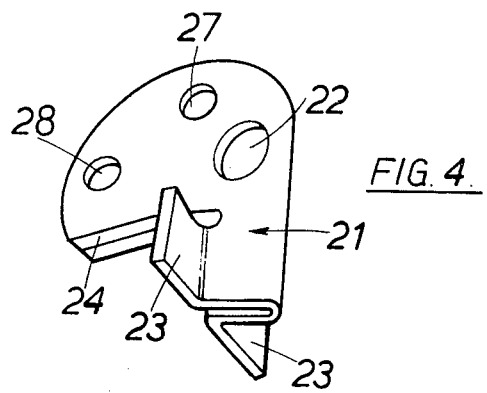
FIG. 4 is a perspective view of a lever for incorporation in the disc brake.

In the hydraulically actuated disc brake illustrated in FIGS. 1 to 4 of the drawings 1 is a stationary drag-taking member adapted to be secured to a fixed part adjacent to one face of a rotatable disc (not shown) by means of bolts passed through openings in circumferentially spaced lugs 2 in the drag-taking member 1.

The stationary drag-taking member 1 is of one-piece construction, preferably a casting, comprising a circumferentially extending bridge piece 3 which is located in a plane parallel to the axis of the disc and which is of substantial axial length. A pair of axially extending circumferentially spaced guiding members 4 integral with the bridge piece 3 and extending upwardly and outwardly with respect to the bridge piece 3, are constituted by spaced arms.

The oppositely facing side faces of the guiding members 4 are of stepped outline and spaced parallel portions 5 at the innermost ends of the side faces constitute guiding surfaces and at their outermost ends lead into spaced parallel guiding surfaces 6 which are spaced apart by a distance greater than the distance between the guiding surfaces 5.

The radially outermost end of the guiding surfaces 6 lead into outwardly directed aligned shoulders 7.

A caliper 8 of generally U-shaped outline including a pair of opposed limbs straddles the disc and is mounted on the drag-taking member 1 between the guiding members 4.

Radially spaced pairs of circumferentially opposed end faces 9 and 10 of limb of the caliper are in sliding engagement with the guiding surfaces 5 and 6 respectively in the arms 4.

The radially outermost end of the one limb is formed with opposed outwardly directed abutment surfaces 11 continuous with the end faces 10 and the abutment surfaces 11 are complementary to and co-operate slidably with the shoulders 7 at the outermost ends of the arms 4.

The one limb incorporates brake applying means in the form of an hydraulic piston 12 working in a bore 13 in the one limb.

A first friction pad assembly 14 in the form of a friction pad 15 carried by a rigid backing plate 16 is interposed between the piston 12 and the disc and is guided between the oppositely facing guiding surfaces 5.

A second friction pad assembly (not shown) for engagement with the face of the disc remote from the stationary member 1 is carried by the other limb of the caliper 8.

In the application of the brake hydraulic fluid under pressure is admitted to the closed end of the bore 13 and advances the piston 12 in the bore 13 to apply the first friction pad assembly 14 to an adjacent face of the disc 1. Simultaneously the reaction on the caliper 8 causes the caliper to slide relative to the stationary member 1 in the opposite direction to apply the second friction pad assembly to the opposite face of the disc. In a normal direction of disc rotation the drag on the directly actuated friction pad assembly 14 is taken directly by the trailing arm 4. That is to say the drag is taken by the arm with which any point in the braking surface of the disc last comes into alignment when the disc is rotating in that direction. The drag on the indirectly actuated friction pad assembly in transferred to the arms 4 through the caliper 8. Ideally the drag from the indirectly actuated friction pad assembly will be taken by the guiding surfaces 5 and 6 on the trailing arm 4, since that arm extends over the disc to a point coinciding with the line of action of the force of the drag due to the indirectly actuated friction pad assembly. However, due to tolerance variations, it is possible that the line of action of the force from the drag on the indirectly actuated friction pad assembly will no longer be coincidental with the edge of those guiding surfaces 5 and 6. In that case the caliper 8 is subjected to a turning movement which acts on the guiding surfaces 5 and 6 of the trailing arm 4 and reacts on the guiding surfaces 5 and 6 of the trailing arm 4 and reacts on the guiding surfaces 5 and 6 of the leading arm.

Separation and movement of the caliper 8 in a radially outwards direction with respect to the drag-taking member 1 is controlled by the provision of means in accordance with our invention.

As illustrated in the drawings, aligned recesses 17 are provided in the inner face of the arms 4 of the drag-taking member 1. Each recess 17 is spanned by the stem of an axially extending bolt 18. Each bolt 18 extends inwardly from the outer end of the drag-taking member 1 and the free end of a portion 19 of reduced diameter is received in a recess 20 in a wall defining the inner face of the recess 17. The portion 19 forms a pivotal connection for a lever 21 of the outline of a snail cam. The lever 21 is of double thickness pressed steel construction and is of generally circular outline having an eccentrically arrange opening 22 in which the portion 19 is received. A pair of aligned oppositely directed lugs 23 lying in a plane normal to the plane of the lever 21 are produced by deforming in opposite directions portions of the lever which lie below a split line 24 extending radially inwardly from the edge of the lever 21 remote from the opening 22 and lying on a line passing through the centre of the opening 22. The outer faces of the lugs 23 and the edge of the lever at the split line 24 define a pair of arms arranged at right angles to each other for engagement with a radial surface 25 and shoulder 26 formed in the caliper 8. The shoulder 26 is located above and at right angles to the radial surface 25.

At a position spaced above a line containing the split 24 and passing through the centre of the opening 22 each lever 21 is formed with a pair of circumferentially spaced openings 27 and 28. Each opening 27 lies on a line passing substantially through the centre of the opening 22 at right angles to the split line 24, and the opening 28 lies substantially in a plane containing the outer faces of the lugs 23.

One opening 27 or 28 of each lever 21 forms an anchorage for the lower end of a tension spring 29 of which the outer end is connected to an anchorage 30 on the portion of the caliper 8 containing the abutment surface 11.

Depending upon which openings 27 or 28 form anchorages for the springs 29 the spring forces applied to the caliper 8 act inwardly in either a circumferential direction or in a radial direction. As illustrated in the drawings one of the levers 21 applies a circumferentially directed force to the caliper 8, and the other lever 19 applies a radially directed force to the caliper. Normally the radial force will be applied to the caliper at the leading end of the brake and the circumferentially directed force will be applied at the trailing end.

The provision of the levers 21 and the tension springs 29 serve to ensure that the abutment surfaces 11 are urged into engagement with the shoulder 7, and that at least the surfaces 5 and 9 and 6 and 10 at one end of the brake are urged into engagement. This has the advantage of taking up clearances to reduce undue noise in the application of the brake and reduce relative movement between the caliper 8 and the drag-taking member 1 in the normal operative position.

In the event of failure of one of the tension springs 29 the lever 21 to which that spring is connected serves as a stop to prevent free movement of the caliper 8 away from the drag-taking member 1 in a radially outwards direction. This is achieved by means of a wedging action between the arms of the lever and the shoulder 26 and the surface 25 with which they normally engage alternatively when subjected to loading from the tension spring 29.

In the embodiment described above our invention has been described with reference to a brake of the kind in which the stationary drag-taking member is located adjacent to one face of the disc, and hydraulic actuating means, which are located in one limb of the caliper member, are adapted to apply one friction pad assembly to one face of the disc, the other friction pad assembly being applied to the opposite face of the disc by the reaction of the actuating means which cause the caliper member to slide with respect to the stationary member in a direction parallel to the axis of the disc. It is to be understood, however, that our invention can also be applied to constructions of brake in which the caliper member is provided in each limb with at least one hydraulic actuator, and also to those constructions of brake in which the stationary drag-taking member comprises a U-shaped member straddling the periphery of the disc and provided with a circumferentially extending gap between opposite ends of which the caliper member is guided to slide relative to the disc.

I claim:

1. A disc brake for a vehicle comprising a rotatable disc having a peripheral edge, a stationary drag-taking member adjacent to said disc, a caliper member straddling a portion of said peripheral edge of said disc, friction pad assemblies for engagement with opposite faces of said disc located in said caliper member, actuating means for applying at least one of said friction pad assemblies directly to said disc, first and second complementary surfaces on said members, resilient means for urging said first and second surfaces into engagement, a lever engageable with one member acted upon by said resilient means to urge said first and second surfaces into engagement, and a pivotal connection between said lever and the other of said members, wherein said lever includes first and second relatively spaced locations through which said resilient means can act on said lever, and said first and second surfaces each comprise first and second complementary faces, said locations being so constructed and arranged that when said resilient means acts on said first location one pair of said complementary faces are urged into engagement, and when resilient means acts on said second location a second pair of said complementary faces are alternately urged into engagement.

2. A disc brake as claimed in claim 1, wherein said one pair of said complementary faces are circumferentially arranged, and said second pair of said complementary faces are radially arranged.

3. A disc brake for a vehicle comprising a rotatable disc having a peripheral edge, a stationary drag-taking member adjacent to said disc, a caliper member straddling a portion of said peripheral edge of said disc, friction pad assemblies for engagement with opposite faces of said disc located in said caliper member, actuating means for applying at least one of said friction pad assemblies directly to said disc, first and second sets of complementary surfaces on said members located at circumferentially spaced opposite ends of said brake, circumferentially spaced resilient means for urging into engagement one of said sets of surfaces at each end of said brake, circumferentially spaced levers engageable with one member and acted upon by one of said resilient means to urge into engagement said one of said set of surfaces at that end of said brake, and pivotal connections between said levers and the other of said members, wherein each said lever includes first and second relatively spaced locations through which said resilient means at that end of the brake can act on said lever, said locations on each said lever being so constructed and arranged that when said resilient means acts on said first location said first set of said complementary surfaces at that end of the brake are urged into engagement, and when said resilient means acts on said second location said second set of said complementary surfaces are urged into engagement.

4. A disc brake as claimed in claim 3, wherein each said pivotal connection extends parallel to axis of said disc, and each said resilient means comprises a tension spring, circumferentially spaced fixed anchorages being provided on said one member, and each tension spring acting between one anchorage and one of said locations on said levers at a corresponding end of said brake.

5. A disc brake for a vehicle comprising a rotatable disc having a peripheral edge, a stationary drag-taking member adjacent to said disc, a caliper member straddling a portion of said peripheral edge of said disc, friction pad assemblies for engagement with opposite faces of said disc located in said caliper member, actuating means for applying at least one of said friction pad assemblies directly to said disc, first and second complementary surfaces on said members, resilient means for urging said first and second surfaces into engagement, a lever engageable with one member acted upon by said resilient means to urge said first and second surfaces into engagement, and a pivotal connection between said lever and the other of said members, wherein said lever includes first and second relatively spaced locations through which said resilient means can act on said lever, and said first and second surfaces each comprise first and second complementary faces, said locations being so constructed and arranged that when said resilient means acts on said first location one pair of said complementary faces are urged into engagement, and when said resilient means acts on said second location a second pair of said complementary faces are urged into engagement, and wherein said lever is formed with first and second abutment surfaces which are disposed at right angles to each other and which have intersecting inner ends, one abutment surface being engageable with one of said faces when said resilient means acts on said first location, and the other abutment surface being alternately engageable with another of said faces when said resilient means acts on said second location.

6. A disc brake as claimed in claim 5, wherein said pivotal connection and said first and second abutment surfaces are relatively arranged so that said abutment surfaces are adapted to define stop means to prevent substantial relative movement between said members, at least in a radial direction, upon failure of said resilient means.

7. A disc brake as claimed in claim 6, wherein said one member comprises said caliper member, and said other of said members comprises said stationary member.

8. A disc brake for a vehicle comprising a rotatable disc having a peripheral edge, a stationary drag-taking member adjacent to said disc, a caliper member straddling a portion of said peripheral edge of said disc, friction pad assemblies for engagement with opposite faces of said disc located in said caliper member, actuating means for applying at least one of said friction pad assemblies directly to said disc, first and second sets of complementary surfaces on said members located at circumferentially spaced opposite ends of said brake, circumferentially spaced resilient means for urging into engagement one of said sets of surfaces at each end of said brake, circumferentially spaced levers engageable with one member and acted upon by one of said resilient means to urge into engagement said one of said set of surfaces at that end of said brake, and pivotal connections between said levers and the other of said members, wherein each lever is formed with first and second abutment surfaces disposed at right angles to each other, and each lever includes relatively spaced locations, said resilient means at one end of said brake acting on one location on one lever to urge said first abutment surface into engagement with said one member to apply a circumferentially directed force thereto, said resilient means at the opposite end of said brake acting on an opposite location on the other of said levers to urge said second abutment surface into engagement with said one member to apply a radially directed force thereto.

9. A disc brake as claimed in claim 8, wherein each said lever is of generally circular outline having an eccentrically arranged opening for co-operation with said pivotal connection at a corresponding end of said brake, and a pair of oppositely directed lugs lying in a plane normal to the plane of the lever and lying on a line passing through the centre of said opening defining a first abutment for engagement with a first surface of said one member, a second surface on said lever at right angles to the lugs defining a second abutment for engagement with a second surface on said one member at right angles to said first surface.

10. A disc brake as claimed in claim 9, wherein each lever is provided with a pair of circumferentially spaced openings defining locations through which said resilient means at that end of said brake can act on said lever to apply to said one member one of a circumferentially directed and a radially directed force, one of said circumferentially spaced openings lying on a line passing substantially through the centre of said eccentrically arranged opening, and the other of said circumferentially spaced openings lying in a plane containing faces of said lugs remote from said first abutment.

11. A disc brake as claimed in claim 9, wherein each said lever is of double thickness pressed steel construction, and said lugs are formed by deforming in opposite directions portions of said lever which lie on the side of a split line remote from said eccentrically arranged opening.

* * * * *